(12) United States Patent
Salle et al.

(10) Patent No.: US 8,392,566 B1
(45) Date of Patent: Mar. 5, 2013

(54) COMPUTER EXECUTABLE SERVICES

(75) Inventors: Mathias Salle, San Francisco, CA (US);
Erik L. Eidt, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 12/261,187

(22) Filed: Oct. 30, 2008

(51) Int. Cl.
*G06F 15/173* (2006.01)

(52) U.S. Cl. ........ 709/226; 709/217; 709/223; 709/224; 726/2; 726/27; 726/34; 705/26.8; 713/182

(58) Field of Classification Search ............... 709/226, 709/223, 201, 224, 217; 705/26.8
See application file for complete search history.

(56) References Cited

U.S. PATENT DOCUMENTS

| | | | |
|---|---|---|---|
| 7,464,163 B1 * | 12/2008 | Bantz et al. | 709/226 |
| 7,565,310 B2 * | 7/2009 | Gao et al. | 705/26.8 |
| 7,584,262 B1 * | 9/2009 | Wang et al. | 709/217 |
| 2003/0172145 A1 * | 9/2003 | Nguyen | 709/223 |
| 2005/0080845 A1 * | 4/2005 | Gopinath | 709/201 |
| 2007/0097659 A1 * | 5/2007 | Behrens et al. | 361/788 |
| 2009/0150789 A1 * | 6/2009 | Regnier | 715/736 |

\* cited by examiner

*Primary Examiner* — Kyung H Shin

(57) ABSTRACT

A method comprises determining available hardware, determining computer executable services based in part on the available hardware, displaying a catalog of the computer executable services, receiving a selection of at least one service of the computer executable services, and instantiating the at least one service on the at least one server. The available hardware comprises at least one server.

19 Claims, 12 Drawing Sheets

| | | |
|---|---|---|
| 302 | ACTIVATION SERVICE | THE ACTIVATION SERVICE IS A GENERIC ACTUATOR WHICH RESPONSIBILITY IS TO DISPATCH SERVICE ACTIVATION REQUESTS TO THE APPROPRIATE CUSTOM ACTIVATOR. |
| 304 | APPROVAL SERVICE | THE APPROVAL SERVICE (COMPUTATIONAL SERVICE) IS RESPONSIBLE FOR APPROVING OR NOT A RECEIVED ORDER. |
| 306 | AUTHENTICATION SERVICE | THE AUTHENTICATION SERVICE (DATA AND COMPUTATIONAL SERVICE) IS RESPONSIBLE FOR THE MANAGEMENT OF USERS, ROLES AND ACCESS RIGHT AS WELL AS FOR GRANTING AUTHORIZATIONS. |
| 308 | BILLING SERVICE | THE BILLING SERVICE (COMPUTATIONAL SERVICE) IS RESPONSIBLE FOR SETTING UP CHARGE BACK MECHANISM AND PROPER BILLING FOR RECEIVED ORDERS. |
| 312 | CATALOG SERVICE | THE CATALOG SERVICE (COMPUTATIONAL SERVICE) IS RESPONSIBLE FOR THE GENERATION OF A SERVICE OFFERINGS. |
| 314 | CONFIGURATION MANAGEMENT SERVICE | THE CONFIGURATION MANAGEMENT SERVICE (DATA SERVICE) IS RESPONSIBLE FOR CARRYING OUT THE BINDING PHASE OF THE INSTANTIATION PROCESS AND FOR THE MANAGEMENT OF THE LIFECYCLE OF INSTANCES. |
| 316 | CREATION CONFIGURATION SERVICE | THE CREATION CONFIGURATION SERVICE (DATA SERVICE) IS RESPONSIBLE FOR CARRYING OUT THE GROUNDING PHASE OF THE INSTANTIATION PROCESS. |
| 318 | DESIGN SERVICE | THE DESIGN SERVICE (DATA SERVICE) IS RESPONSIBLE FOR THE MANAGEMENT OF THE LIFECYCLE OF MODELS. |

FIG. 3A

| | | |
|---|---|---|
| 322 | DISCOVERY SERVICE | THE DISCOVERY SERVICE (COMPUTATIONAL SERVICE) IS A GENERIC ACTUATOR RESPONSIBLE FOR TRIGGERING THE DISCOVERY OF ASSETS IN THE INFRASTRUCTURE TO FULFILL ITS RESPONSIBILITY, ITS CONNECTS TO CUSTOM DISCOVERY SERVICES. |
| 324 | INCIDENT SERVICE | THE INCIDENT SERVICE (DATA SERVICE) IS RESPONSIBLE FOR THE MANAGEMENT OF THE LIFECYCLE OF INCIDENTS. |
| 326 | INSTALLER SERVICE | THE INSTALLER SERVICE IS A GENERIC ACTUATOR WHICH RESPONSIBILITY IS TO DISPATCH SERVICE INSTALLATION REQUESTS TO THE APPROPRIATE CUSTOM ACTIVATOR. |
| 328 | LOGGING SERVICE | THE LOGGING SERVICE (DATA SERVICE) IS RESPONSIBLE FOR THE LIFECYCLE MANAGEMENT OF LOG MESSAGES |
| 332 | MONITORING SERVICE | THE MONITORING SERVICE IS A GENERIC ACTUATOR WHICH RESPONSIBILITY IS TO DISPATCH SERVICE MONITORING REQUESTS TO THE APPROPRIATE CUSTOM ACTIVATOR |
| 334 | OFFERING AVAILABILITY ESTIMATION SERVICE | THE OFFERING AVAILABILITY ESTIMATION SERVICE (COMPUTATIONAL SERVICE) IS RESPONSIBLE FOR THE GENERATION OF SERVICE OFFERING AVAILABILITY AND PRICING |
| 336 | ORDER PROCESSING SERVICE | THE ORDER PROCESSING SERVICE (DATA SERVICE) IS RESPONSIBLE FOR THE MANAGEMENT OF THE LIFECYCLE OF ORDERS |

FIG. 3B

| | | |
|---|---|---|
| 338 | PACKAGE MODEL DESIGN SERVICE | THE PACKAGE MODEL DESIGN SERVICE (DATA SERVICE) IS RESPONSIBLE FOR THE LIFECYCLE MANAGEMENT OF PACKAGE MODEL. |
| 342 | POLICY SERVICE | THE POLICY SERVICE (DATA AND COMPUTATIONAL SERVICE) IS A GENERIC SERVICE AND HAS RESPONSIBILITY OF DISPATCHING POLICY EVALUATION REQUESTS TO THE APPROPRIATE SPECIFIC POLICY SERVICES. |
| 344 | REQUEST RESOLUTION SERVICE | THE REQUEST RESOLUTION SERVICE (COMPUTATIONAL SERVICE) IS RESPONSIBLE FOR THE INITIATING THE INSTANTIATION PROCESS OF MODELS. |
| 346 | RFC EXECUTION SERVICE | THE REQUEST FOR CHANGE (RFC) EXECUTION SERVICE (DATA SERVICE) IS RESPONSIBLE FOR THE MANAGEMENT OF THE LIFECYCLE OF RFCS IN THE PLATFORM. |
| 348 | RFC SCHEDULING SERVICE | THE REQUEST FOR CHANGE (RFC) SCHEDULING SERVICE (COMPUTATIONAL SERVICE) IS RESPONSIBLE FOR THE FINDING OPTIMAL SCHEDULES FOR RFC IN THE PLATFORM. |
| 352 | SESSION SERVICE | THE SESSION SERVICE (DATA SERVICE) IS RESPONSIBLE FOR THE MANAGEMENT OF THE LIFECYCLE OF SESSIONS. THE CREATE METHOD GENERATE A NEW SESSION IN THE OPEN STATE ASSOCIATED WITH A NEW, UNIQUE SESSIONKEY, CHANGES TO THE SESSION STATE, SUCH AS CLOSING THE SESSION, IS DONE THROUGH THE UPDATE METHOD. |
| 354 | VALIDATION SERVICE | THE VALIDATION SERVICE (COMPUTATIONAL SERVICE) IS RESPONSIBLE FOR THE VALIDATION OF THE WELL FORMNESS OF AN ORDER. |
| 356 | CHANGE CATALOG SERVICE | THE CHANGE CATALOG SERVICE IS RESPONSIBLE FOR THE MANAGEMENT OF CHANGES TO THE CATALOG. |
| 358 | CONSUMER MANAGEMENT SERVICE | THE CONSUMER MANAGEMENT SERVICE IS RESPONSIBLE FOR PROVIDING AN INTERFACE FOR CONSUMERS AND MANAGES RETRIEVING SERVICE OFFERINGS, ORDERING SERVICES, RETRIEVING CHANGES, ORDER CHANGES, AND LOGINS. |
| 360 | PROVIDER MANAGEMENT SERVICE | THE PROVIDER MANAGEMENT SERVICE IS RESPONSIBLE FOR PROVIDING AN INTERFACE FOR PROVIDERS AND MANAGES USERS, DESIGNS, AND PRICING. |

FIG. 3C

COMPUTER EXECUTABLE SERVICES

FIELD

Embodiments of the present invention relate in general to the field of information technology.

BACKGROUND

Over the last few years, information technology (IT) organizations have increasingly adopted standards and best practices to ensure efficient IT service delivery. In this context, the IT Infrastructure Library (ITIL) has been rapidly adopted as the de facto standard. ITIL defines a set of standard processes for the management of IT service delivery organized in processes for Service Delivery (Service Level Management, Capacity Management, Availability Management, IT Continuity Management and Financial Management) and Service Support (Release Management, Configuration Management, Incident Management, Problem Management and Change Management). The service support processes, such as Configuration Management, Incident Management, and Configuration Management are some of the more common processes IT organizations have implemented to bring their service to an acceptable level for their businesses.

The implementation of ITIL processes has yielded significant results to IT organizations by defining interfaces between service providers and consumers; by clarifying the IT organizational structures, roles, and responsibilities; and by designing internal processes for the management of IT operations. IT Service Management (ITSM) is a process-based practice intended to align the delivery of IT services with the needs of the enterprise, while emphasizing benefits to customers. ITSM focuses on delivering and supporting IT services that are appropriate to the business requirements of the organization, and it achieves this by leveraging ITIL-based best practices that promote business effectiveness and efficiency. Thus, the focus of ITSM is on defining and implementing business processes and interactions there between to achieve desired results. IT services are typically built around the processes. For example, in a manufacturing application, the ITSM may provide services built around a build-to-order manufacturing process scenario. The ITSM architecture generally provides services that are capable of being directly instantiated. With a focus on processes, presenting and packaging an organization's IT needs may be a challenge in an ITSM environment.

SUMMARY

Various embodiments of methods, systems, and computer program products for computer executable services are discussed herein. In one embodiment, a method comprises determining available hardware, determining computer executable services based in part on the available hardware, displaying a catalog of the computer executable services, receiving a selection of at least one service of the computer executable services, and instantiating the at least one service on the at least one server. The available hardware comprises at least one server.

BRIEF DESCRIPTION OF THE DRAWINGS

FIGS. 3A, 3B, and 3C illustrate in a tabular form an example list of service operations supported by an architecture described with reference to FIGS. 2A and 2B, according to an embodiment.

DESCRIPTION OF EMBODIMENTS

Figure 1A:
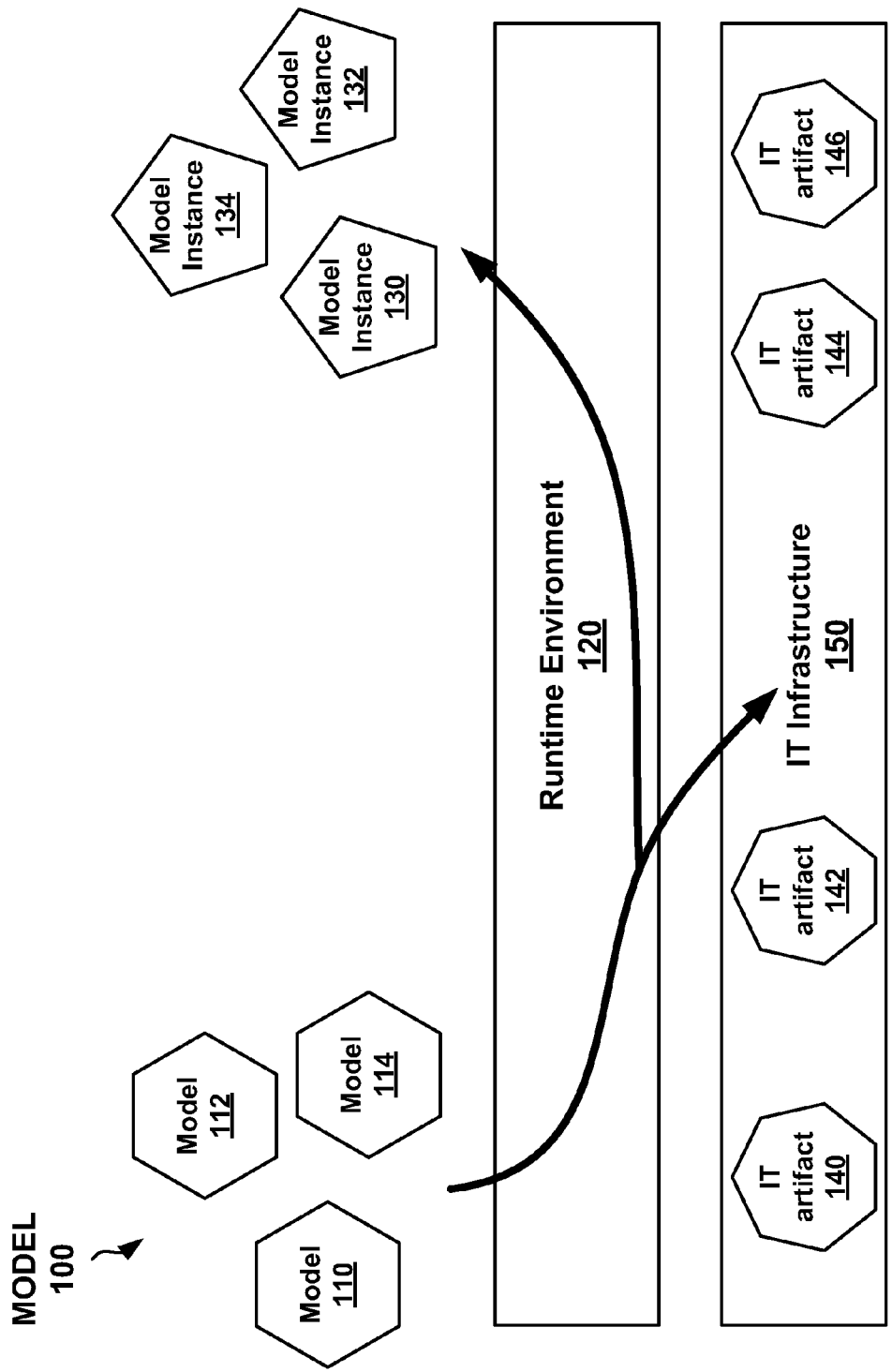
FIG. 1A illustrates an example structure of a model for IT services, according to an embodiment.

Reference will now be made in detail to various embodiments of the present invention, examples of which are illustrated in the accompanying drawings. While the embodiments of the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

The following terminology may be useful in understanding embodiments of the present disclosure. It is to be understood that the terminology described herein is for the purpose of description and should not be regarded as limiting.

Architecture—A blueprint or basic infrastructure designed to provide one or more functions. An architecture used in an IT environment may typically include hardware, software and services building blocks that are designed to work with each other to deliver core functions and extensible functions. The core functions are typically a portion of the architecture, e.g., an operating system, which may not be modifiable by the user. The extensible functions are typically a portion of the architecture that has been explicitly designed to be customized and extended by the user as a part of the implementation process. For example, services oriented architecture (SOA) is a type of an architecture used for addressing the need for structuring IT services that lowers cost and enhances reusability.

Model—A model can be a representation of the characteristics and behavior of a system, element, solution, or service. A model as described herein captures the design of a particular IT system, element, solution, or service. The model can be a declarative specification of the structural, functional, non-functional, and runtime characteristics of the IT system, element, solution, or service. The instantiation of a model creates a model instance. Unlike object oriented (OO) theory, in which an instance object can be a slot space, the model instance can be a design space that may be capable of accommodating refinement.

IT artifact—An IT artifact refers to a tangible attribute or property of an IT system. Examples of an IT artifact may include hardware, software, documentation, source code, test apparatus, project plans, educational and marketing material, and similar others. The IT artifact may be available for external or internal use.

Separation of concerns—A technique for addressing different issues of a problem individually, thereby making it possible to concentrate on each issue separately. Applying this principle may result in a decrease in the complexity by dividing the problem into different smaller issues; support division of efforts and separation of responsibilities; and improve the modularity of IT systems or artifacts.

Service—Utility or benefit provided by a provider to a consumer. The provider and the consumer may vary by application and may include an enterprise, a business unit, a business process, an application, a third party, an individual, and similar others. Enterprise services may be provided in the course of conducting the enterprise business. IT services generally refer to any application that enables the enterprise to provide utility or benefit by adding functionality to the IT infrastructure.

Service Model—A service model can be the representation of a service within a SOA. It defines the externally visible description, behavior, state, and operations available from a service to other services. As described herein, instantiation of a service model can be conducted in two phases—a binding phase and a grounding phase. The binding phase can be responsible for resolving dependencies between models. The grounding phase can be responsible for materializing the instances, e.g., by creating an IT artifact corresponding to the specification defined in the service model instance.

Meta Model—A meta model (or metamodel) can be a description of a set of building blocks, constructs and rules that define the model itself.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Applicants recognize that it would be desirable to provide a services architecture that would include tools and techniques to initially design, reuse, maintain, and refine services during their entire lifecycle, thereby ensuring alignment between IT services and IT infrastructure. That is, it would be desired to provide IT service lifecycle management tools and techniques that would promote the development, capture, and subsequent reuse and refinement of reliable and scalable services. Applicants further recognize that it would be desirable that the separation of concerns between the artifacts managed by the services be based on roles, e.g., a designer or developer and an end user of services. Therefore, a need exists to provide improved tools and techniques to be used in the automation of IT services lifecycle management.

Embodiments of systems and methods disclosed herein provide an architecture that is capable of designing and delivering IT services that are entered as a configure-to-order compared to a build-to-order provided by traditional ITSM services. An analogy may be made between a builder that is capable of building standard model homes that are orderable as a build-to-order home and an architect designed home that is capable of building a customized home in accordance with user specifications and that is orderable as a configure-to-order home. New features or functions of the configure-to-order home that were not included in the standard build-to-order home may be cataloged (with known price and delivery) and offered as re-usable features or functions that may be combined with existing model homes.

A Model for Information Technology (IT) Services

FIG. 1A illustrates an example structure of a model 100, according to an embodiment. The model 100 captures the design of a particular IT element or solution, e.g., IT services captured as a service model. As described earlier, a service model can be the representation of a service within a SOA. It defines the externally visible description, behavior, state, and operations available from a service to other services. The model 100 includes one or more models 110, 112 and 114 capable of being instantiated in a runtime environment 120 to generate corresponding model instances 130, 132 and 134 and corresponding IT artifacts 140, 142, 144 and 146 generated in an IT infrastructure 150. Thus, the instantiation of a model results in a generation of a virtual runtime object, e.g., the model instance, and also results in a generation of a real, tangible IT artifact in the IT infrastructure 150. The IT infrastructure 150 may be a data center that includes hardware, software, communications, applications, services and similar other components to provide IT functions. The runtime environment 120 includes services that process the models 110, 112 and 114.

The model 100 can be a declarative specification of the structural, functional, non-functional, and runtime characteristics of an IT system. That is, the model 100 may use declarative programs that may include expressions, relationships, or statements of truth. The declarative programs may not include variables. Closely equivalent to the concept of a class in Object Oriented (OO) theory, the model 100 supports the principles of encapsulation and hiding of implementation detail. As in OO, the model 100 also supports recursive composition. Also as in OO theory, in which a class instantiation results in an object, the instantiation of a model results in the creation of a model instance. However, unlike OO, in which an instance object is a slot space, the model instance, e.g., each of model instances 130, 132 and 134, can be a design space that can accommodate refinement. In addition, as described earlier, a corresponding IT artifact becomes associated with the model. In the depicted embodiment, the bi-instantiation process for the models 110, 112 and 114 is desirable to not only create a virtual runtime object that represents that particular instance of the model but in addition also generate an IT component or system in the real, tangible, IT Infrastructure 150. A relationship between a model instance, e.g., one of the model instances 130, 132 and 134, and an IT artifact, one of the IT artifacts 140, 142, 144 and 146, is therefore homomorphic. That is, one represents the other and a change in one is reflected in the other. Additional description of the two-phase instantiation process for a model is described with reference to FIG. 1B.

Referring back to FIG. 1A, in order to support initial design, reuse, maintain, and refinement during the entire lifecycle of the models, the model 100 supports the following example properties (among others): refinement, variability, polymorphism, composability, import, association, constructors, operations, deployment, monitors, declarative modeling language, and best practice. Recursive composability enables a designer to depend on and leverage existing designs in order to define or create new ones, which in turn are available to others to reuse. Refinement allows the instantiation process to be multi-step, thereby allowing for a greater flexibility in the model design. Encapsulation (also referred to as information hiding), use of clear boundary between the visibility into the internal design of a model and its publicly available characteristics, supports inter-model dependencies that allow changes to the internal specification without requiring changes in the model user. Characterization enables the expressing the outward nature of the model in terms that are directly relevant to the consumer of the model instead of in terms relevant to the implementer. Variation enables capturing variations in a single model. A model may be defined under several variations of its characteristics to reflect specific changes to the underlining design. Capturing these variations in a single model avoids combinatorial explosion of models and supports better model reuse. Declaration enables definition of models using declarative specifications. The models are defined in terms of their association to underlying design instead of as process steps for instantiation using programming code. Use of statements of truth to define the models reduce errors due to interpretation or avoid use of languages have meaning only during execution in the intended environment.

The models 110, 112 and 114 can be defined by a meta model, thereby enabling the models 110, 112 and 114 to be translated into other modeling languages. Thus, model 100 enables easy translation of user-defined models to other forms (both model-oriented and script-oriented forms) thereby enhancing its flexibility. In addition, model 100 provides the tools and techniques for the replacement of one modeling language with other modeling languages and for the coexistence of multiple structural modeling languages. As described herein, a meta model is a model that further explains or describes a set of related models. Specifically, the meta model includes an explicit description (of constructs and rules) of how a domain-specific model is built.

The model 100 may be specified by using various modeling languages including, among others, a unified modeling language (UML), the Resource Description Framework (RDF), Extensible Markup Language (XML) Schema, XML Metadata Interchange (XMI), and Java languages or a combination thereof. The RDF may include extensions such as RDF schema and languages such as the RDF Ontology Web Language (RDF/OWL).

The concept of refinement, which may be an example of an extensible feature of the model 100, allows a smooth multi-valued transition from a model to a model instance. Whereas classic modeling approaches [OO, CIM, SML, UML] are based on a single value slot mechanism for instance creation, refinement can be based on a linked list approach that enables multi-slot capabilities for model elements. In addition, substitution can be supported, similar to XML schema. A refinable object or a refinable model element is any object/element that extends a refinable construct. The refinable construct carries metadata including: 1) allowRefinement: a Boolean attribute that can be used to stop the refinement process, 2) timestamp: a timestamp that record the time at which the refinement occurred, and 3) tag: a tag that records extra information such as purpose of the refinement or similar other.

Figure 1B:
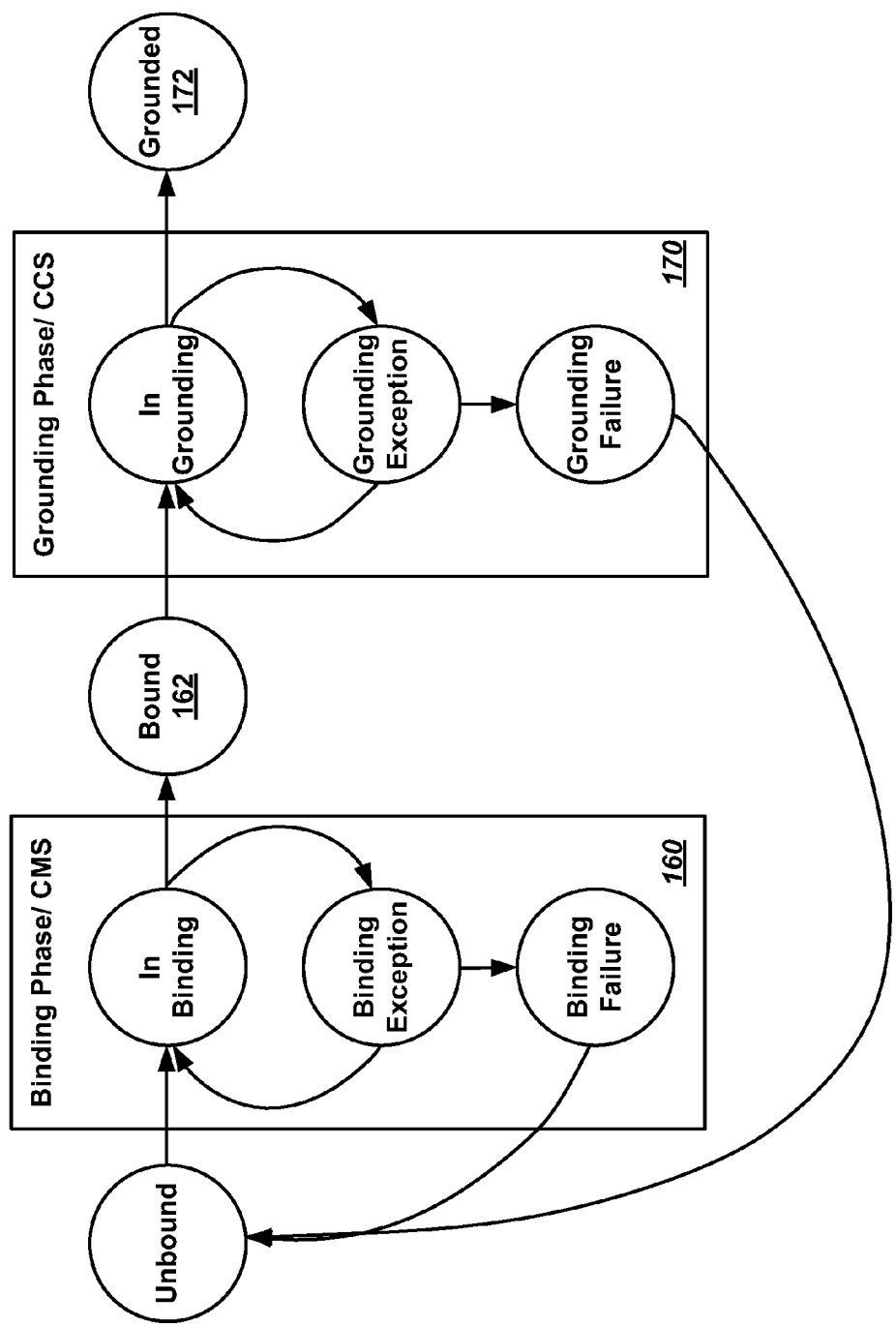
FIG. 1B describes a state transition diagram for a two-phase model instantiation process, according to an embodiment.

FIG. 1B illustrates a state transition diagram for a two-phase model instantiation process, according to an embodiment. The instantiation of a model, e.g., any one of the models 110, 112 and 114, can be conducted in two phases: a binding phase 160 and a grounding phase 170. In an example, non-depicted embodiment, the binding phase 160 may be implemented in a binding phase engine and a grounding phase 170 may be implemented in a grounding phase engine. In the binding phase 160 inter-model dependencies, e.g., made by a model to other models, can be resolved. An output of the binding phase 160 is a bound model instance 162. Model instances 130, 132, and 134 are examples of the bound model instance 162. The binding phase 160 may be viewed to provide a dynamic linking between model instances. Dependencies to other models can be abstract, refined or very specific and the binding phase 160 resolves these types of model references by reusing existing instances or creating new instances. The binding phase can be inherently recursive in that the binding of a dependent model can itself trigger a binding of its dependencies.

In the grounding phase 170, the bound model instance 162 can be materialized to generate a bound and grounded model instance 172. The materializing includes creating an IT artifact corresponding to the specification defined in the model instances. This can be achieved by recursively traversing the instance tree and creating, when appropriate, the corresponding artifacts in the IT infrastructure. IT artifacts 140, 142, 144 and 146 are examples of a bound and grounded model instance 172.

An Architecture for a Runtime Environment

Figure 2A:
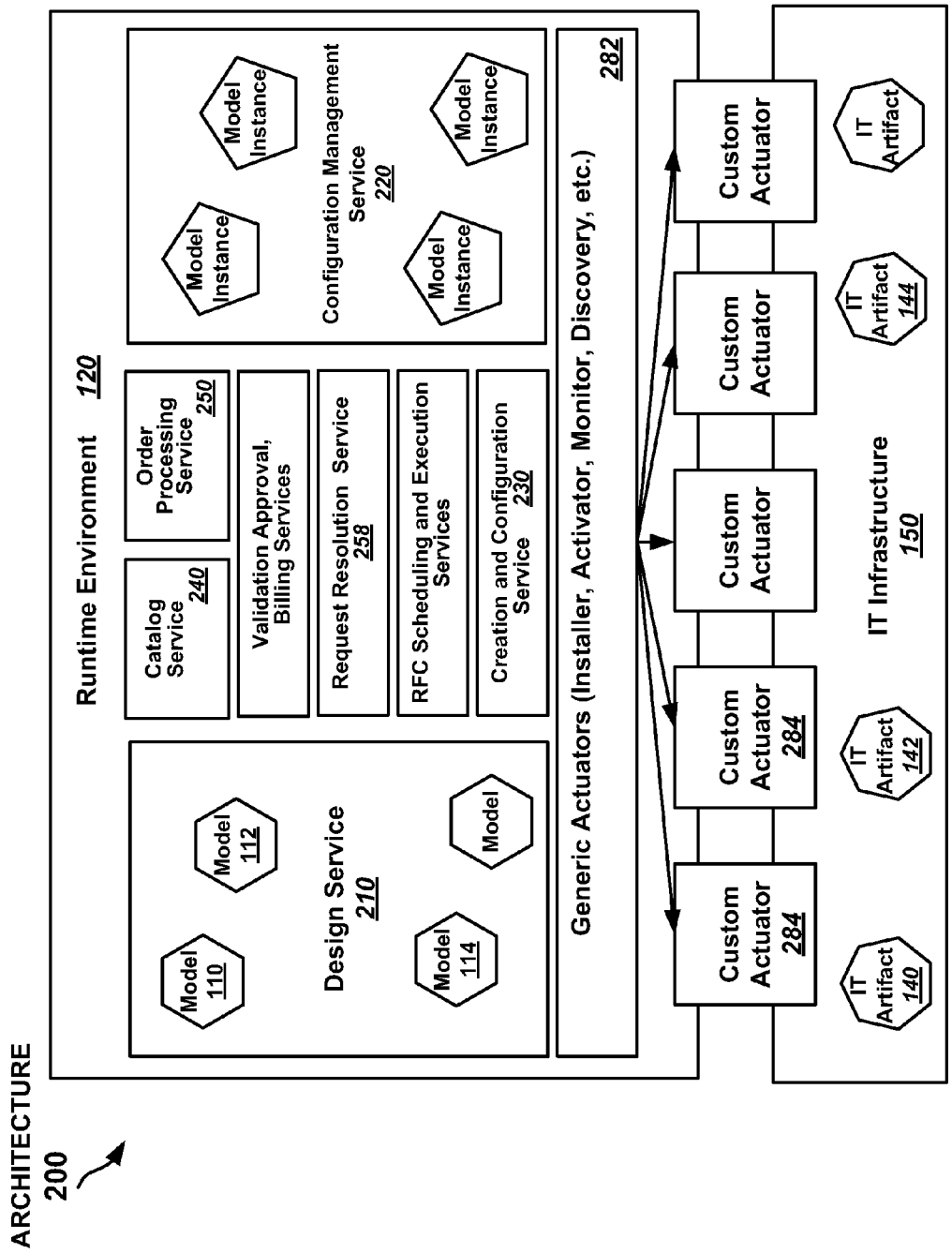
FIG. 2A illustrates an architecture for a runtime environment described with reference to FIG. 1A, according to an embodiment.
Figure 2B:
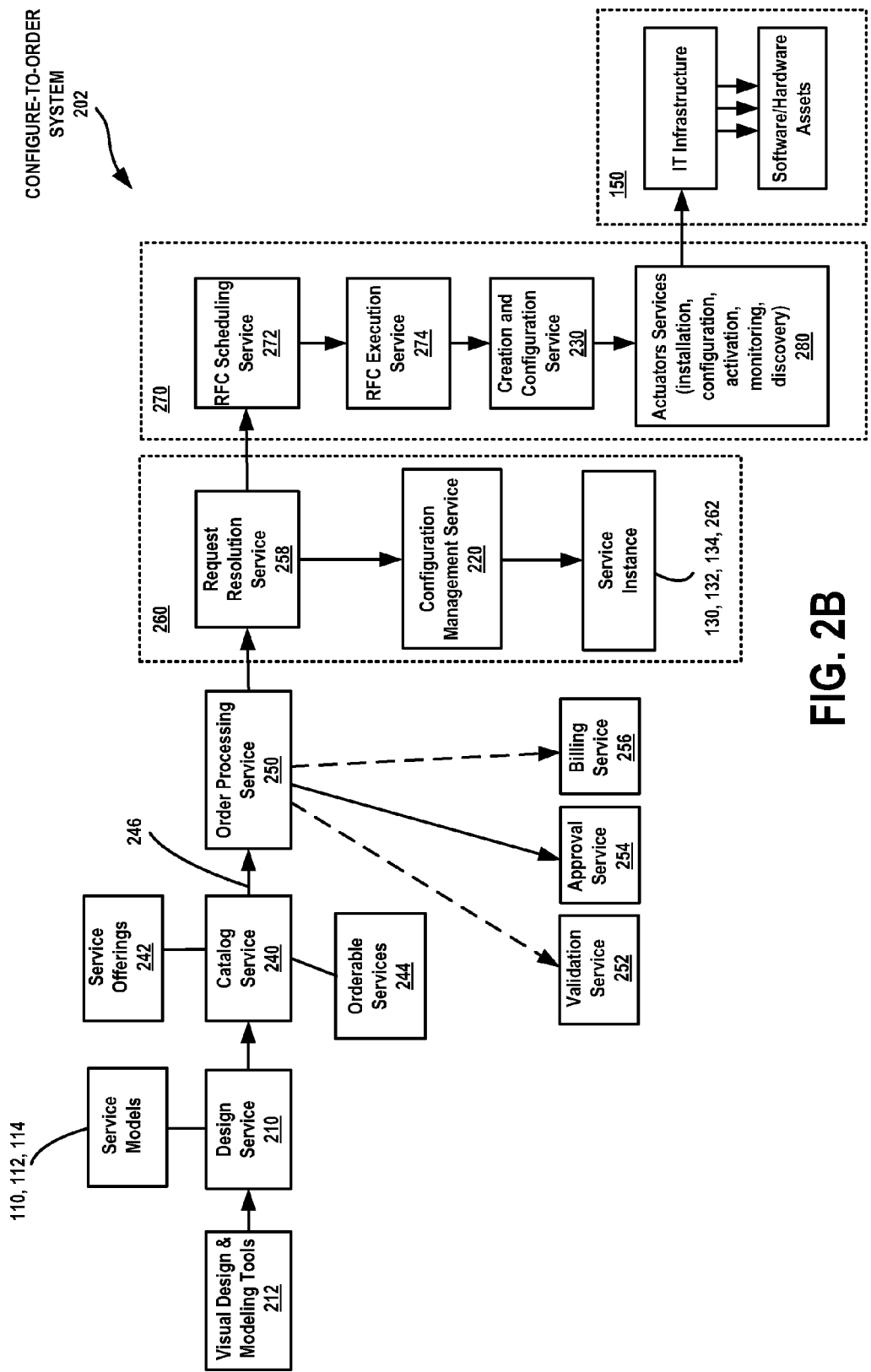
FIG. 2B illustrates a block diagram of a configure-to-order system to implement an architecture described with reference to FIG. 2A, according to an embodiment.

FIG. 2A illustrates an architecture 200 for a runtime environment 120 described with reference to FIG. 1A, according to an embodiment. The architecture 200 can be deployed to provide e-commerce for IT services. That is, the architecture 200 may be deployed as a configure-to-order business system in which a set of predefined models of IT systems are offered to customers (may include internal or external users, clients and similar others). FIG. 2B illustrates a block diagram of a configure-to-order system 202 to implement an architecture 200 described with reference to FIG. 2A, according to an embodiment.

Referring to FIGS. 2A and 2B, the predefined models are for IT services. It is understood that the models may be expressed for other aspects of IT within an enterprise. The architecture 200 includes a design service 210 operable to generate models 110, 112 and 114. The design service 210 may include design tools 212 and techniques (such as declarative programming) available to a designer or an architect of IT services to manage the lifecycle of the models from initial design to cataloging to refinement. In a particular embodiment, the design service 210 can be operable to capture declarative specifications of services as a service model.

A catalog service 240 can be operable to store a plurality of service offerings 242. The plurality of service offerings 242 are models of services that are cataloged and are orderable by a customer. The catalog service 240 communicates with the design service 210 to access one or more service models that are new and not been previously cataloged. The service models may include modifications or refinements made to existing models included in the plurality of service offerings 242. The one or more service models generated by the design service 210 are combined into the plurality of service offerings 242 to provide a catalog of orderable services 244.

End users may access the features of the configure-to-order system 202 through the catalog service 240 and an Order Processing Service (OPS) 250 to browse, search, select, configure, and order the type of service model to be created and ordered or the type of changes desired to an existing model. In order to simplify the user interface, the catalog service 240 may filter model information provided to the user. That is, complex details about the model and its methods and properties, which may be provided to a designer or an architect, may be hidden from the user, thereby simplifying the user interface. For example, complex details of a blade server model having several processors arranged as a cluster may be presented to the user as a normal, high, and non-stop availability selection. Included in the information provided to the user is price and delivery associated with the order. In a particular embodiment, at least one orderable service 246 can be selectable from the catalog of orderable services 244 for placing an order. The selection may be performed by one of a user and an application program. In a particular embodiment, the OPS 250 can include a set of intermediate services for performing validation 252, approval 254 and billing 256 of the end user order.

An order instantiation service 260 is coupled to receive the order (that has been validated and approved) for the at least one orderable service 246 from the OPS 250. Specifically, upon validation and approval of the order by the OPS 250, a request resolution service 258 can be triggered to initiate further processing of the order by the order instantiation service 260. The order instantiation service 260 can be operable to instantiate the at least one orderable service 246, thereby generating an instantiated ordered service 262. The order instantiation service 260 includes a configuration management service (CMS) 220 operable to perform the binding phase 160 and generate the instantiated ordered service 262. The CMS 220 includes tools and techniques for implementing the binding phase 160 of the two-phase instantiation process as well the management of the model instances, e.g., model instances 130, 132 and 134. The CMS 220 generates a service instance corresponding to each order.

An order fulfillment service 270 can be operable to fulfill the order in accordance with the instantiated ordered service 262. The order fulfillment service 270 can include a request for change (RFC) scheduling 272 and a RFC execution service 274 for the sequencing of the various orders in the runtime environment 120. The order fulfillment service 270 includes a creation and configuration service (CCS) 230 operable to perform the grounding phase 170 of instantiated ordered service 262. The CCS 230 includes tools and techniques for the implementation of the grounding phase 170, which includes creation of IT artifacts (such as artifacts 140, 142, 144 and 146) in the IT infrastructure 150.

The connection between the runtime environment 120 and the IT infrastructure 150 can be performed through an actuator service 280. The actuator service 280 may include two layers, a generic actuator 282 and a custom actuator 284. In an embodiment, more than one generic actuators and more than one custom actuators may be included. The generic actuator 282 can be operable to dispatch instances to the custom actuator 284. For example, a server model may be configured to define deployment and provisioning information related to a Rapid Deployment Pack (RDP) deployer. A deployment request can be triggered from the CCS 230 to a generic installer included in the generic actuator 282, which in turn will search for a specialized deployer that can handle RDP deployment information. This technique enables a loose coupling between the runtime environment 120 and the IT infrastructure 150 and offers a high level of customization. That is, the architecture 200 provides IT service lifecycle management tools and techniques that promote the development, capture, and subsequent reuse and refinement of reliable and scalable services. In addition, the architecture 200 further provides the separation of concerns between the artifacts managed by the services be based on roles, e.g., a designer or developer (e.g., user of the design service 210) and an end user of services (e.g., user of the catalog service 240).

In a particular embodiment, the architecture 200 is scalable to be deployed in applications having varying scope and complexity starting from a blade server to a large scale, enterprise-wide IT service. In an example non-depicted embodiment, SmartRack can be an example name of an application of the architecture 200 that combines hardware, management software, and applications to provide customers with a unique, systematic experience to IT conceptualization, delivery, and consumption. This can be accomplished by both shipping the management software embedded with the hardware and by providing a systematic way of modeling applications that can be deployed. Once a SmartRack is powered on, the main point of user contact can be the catalog service. Service offerings can be presented to the user along with their available configuration options, each of which are characterized in terms of the resulting service's attributes, the cost, and time to build. Service offerings may be dynamically generated views based on a set of rich models, stored in the design service, that weave together the structural, functional, non functional, and runtime characteristics of a service using a set of best practices. In a typical deployment, SmartRacks may be configured with pre-populated foundation models. Other models may be either purchased and downloaded from Hewlett Packard Development Company, L.P. (HP) or 3rd parties, or developed in house by customers. Once the appropriate service offering is selected and ordered, it can be sent to the management services that will process it and ground (materialize) it using a set of installer services. If specified in the model, once grounded, the various elements of the model are automatically monitored by monitoring service(s). SmartRacks may be deployed in stand alone mode when a customer only desired one rack of blades. In addition, through its built-in federation capability, several SmartRacks can be combined together providing a unified management experience for the customer. Lastly, SmartRack, through its open SOA architecture and service proxy technology, can support the substitution of its services by external services allowing SmartRacks to reuse existing management software assets of the enterprise, and, allow more than one SmartRacks to be combined so that they are both managed through one user interface (instead of each being independent).

In an example, non-depicted embodiment, the architecture 200 can be a scaled up to a full enterprise architecture that puts services as the key economic principle of value transfer between business (or enterprise) and IT. IT may provide "IT-consumed services" to operate itself (tools and techniques to improve internal productivity). These are things like service desk technologies, change management systems, blades, facility services, networks, employees, legal services. These services can be thought of as the tooling of IT, and together they can be used to create the IT deliverable, the "IT-delivered service." IT-delivered services can be created by IT for use by the business. Examples might include a consumer credit check service, employee expense reporting service, new employee set up service, a QA lab rental service, a private network and similar others. The IT delivered services can be delivered as an economic unit of value to the business. In other words, they are designed, constructed and delivered in a way such that the lines of business see its value, and are willing and able to purchase them. In fact, the IT-delivered service transforms into to a business-consumed service at the moment of payment. This payment can be indicative of the value as perceived the consumer, which in this case is the line of business. The IT-delivered services in and of themselves render IT as a service provider.

IT services provided to a business may be defined starting with a name (e.g. sales forecasting service), followed by a description (e.g. daily worldwide sales pipeline report and analysis for senior sales management). Every service may need additional artifacts and descriptors that are associated with the ongoing integrity of the service. These may include the service level agreements (SLAs) so that IT and the business are aligned around performance and availability, a logical and physical view of the configuration items that underpin the service, a view of dependant services, documentation, a continuity plan, knowledge entries, subscriber entitlements, and security and access provisions. The IT services may be defined by defining a service-line category structure. Just like consumer goods providers have product line categories, so do IT services. They may include employee services, application services, network services, others. Similar to consumer products, IT services may be established with a price, value and business outcome for each service. In order to qualify as an IT-delivered service, it is desirable that there is an associated, measurable business outcome. The IT services can be made available through a customer catalog service by developing a consistent way to articulate both a public characterization (business-facing) and private implementation (IT-facing). Service components can be reused whenever possible. Consistent design criteria for both the public and private facing aspects of the service can directly impact the process automation effort required to instantiate, monitor and manage the service throughout its lifecycle. Service visibility and integrity can be maintained at all levels including management stakeholders like the service desk, problem managers, change managers, application owners, IT finance managers, business relationship managers are able to view and manage activities around the service definition in a consistent way. When scaling up to the enterprise-wide architecture, IT provided services are defined as models and the services of the runtime environment are the embodiments of the IT consumed services.

Example Services Supported by the Architecture 200

FIGS. 3A, 3B, and 3C illustrate in a tabular form an example list of service operations supported by the architecture 200 described with reference to FIGS. 2A and 2B, according to an embodiment. In accordance with the principles of Service Oriented Architecture (SOA), components in the architecture 200 are conceived as services, that is, independent units of functionality with well specified interfaces and data models. The list of services may be described to perform a generic service (for aggregating data across data services), a data service (for the management of lifecycle of specific data models), a computational service (for the execution of business logic) or a combination thereof. An activation service 302 can be a generic actuator with responsibility to dispatch service activation requests to an appropriate custom activator. An approval service 304 (computational service) can be responsible for approving or not approving a received order. An authentication service 306 (data and computational service) can be responsible for the management of users, roles and access rights as well as granting authorizations. A billing service 308 (computational service) can be responsible for setting up charge back mechanism and proper billing for received orders.

A catalog service 312 (computational service) can be responsible for the generation of a service offerings. A configuration management service 314 (data service) can be responsible carrying out a binding phase of the instantiation process and for the management of the lifecycle of instances. A creation configuration service 316 (data service) can be responsible for carrying out a grounding phase of the instantiation process. A design service 318 (data service) can be responsible for the management of the lifecycle of models.

A discovery service 322 (computational service) can be a generic actuator responsible for triggering the discovery of assets in the infrastructure. To fulfill its responsibility, discovery service 322 can connect to custom discovery services. An incident service 324 (data service) can be responsible for the management of the lifecycle of incidents or events. An installer service 326 can be a generic actuator responsible to dispatch service installation requests to the appropriate custom activator. A logging service 328 (data service) can be responsible for the lifecycle management of log messages.

A monitoring service 332 can be a generic actuator which has the responsibility to dispatch service monitoring requests to the appropriate custom activator. An offering availability estimation service 334 (computational service) can be responsible for the generation of service offering availability and pricing. An order processing service 336 (data service) can be responsible for the management of the lifecycle of orders. A package model design service 338 (data service) can be responsible for the lifecycle management of a package model.

A policy service 342 (data and computational service) can be a generic service and has the responsibility of dispatching policy evaluation requests to the appropriate specific policy services. A request resolution service 344 (computational service) can be responsible for initiation of the instantiation process of models. A request for change (RFC) execution service 346 (data service) can be responsible for the management of the lifecycle of RFCs in the platform. A RFC scheduling service 348 (computational service) can be responsible for finding optimal schedules for RFC in the platform.

A session service 352 (data service) can be responsible for the management of the lifecycle of sessions. The create method generates a new session in the open state associated with a new, unique SessionKey. Changes to the session state, such as closing the session can be done through the update method. A validation service 354 (computational service) can be responsible for the validation of an order.

A change catalog service 356 can be responsible for the management of changes to the catalog, such as changes due to new features, software updates, hardware availability, etc. The consumer management service 358 can be responsible for providing an interface for consumers and manages retrieving service offerings, ordering services, retrieving changes, making order changes, establishing logins, and the like. The provider management service 360 can be responsible for providing an interface for providers, thus allowing management of users and profiles, designs, designs supported, pricing, and the like. In various embodiments, the consumer management service 358 and/or the provider management service 360 coordinates with the session service 352 to provide an interface for users.

Figure 4:
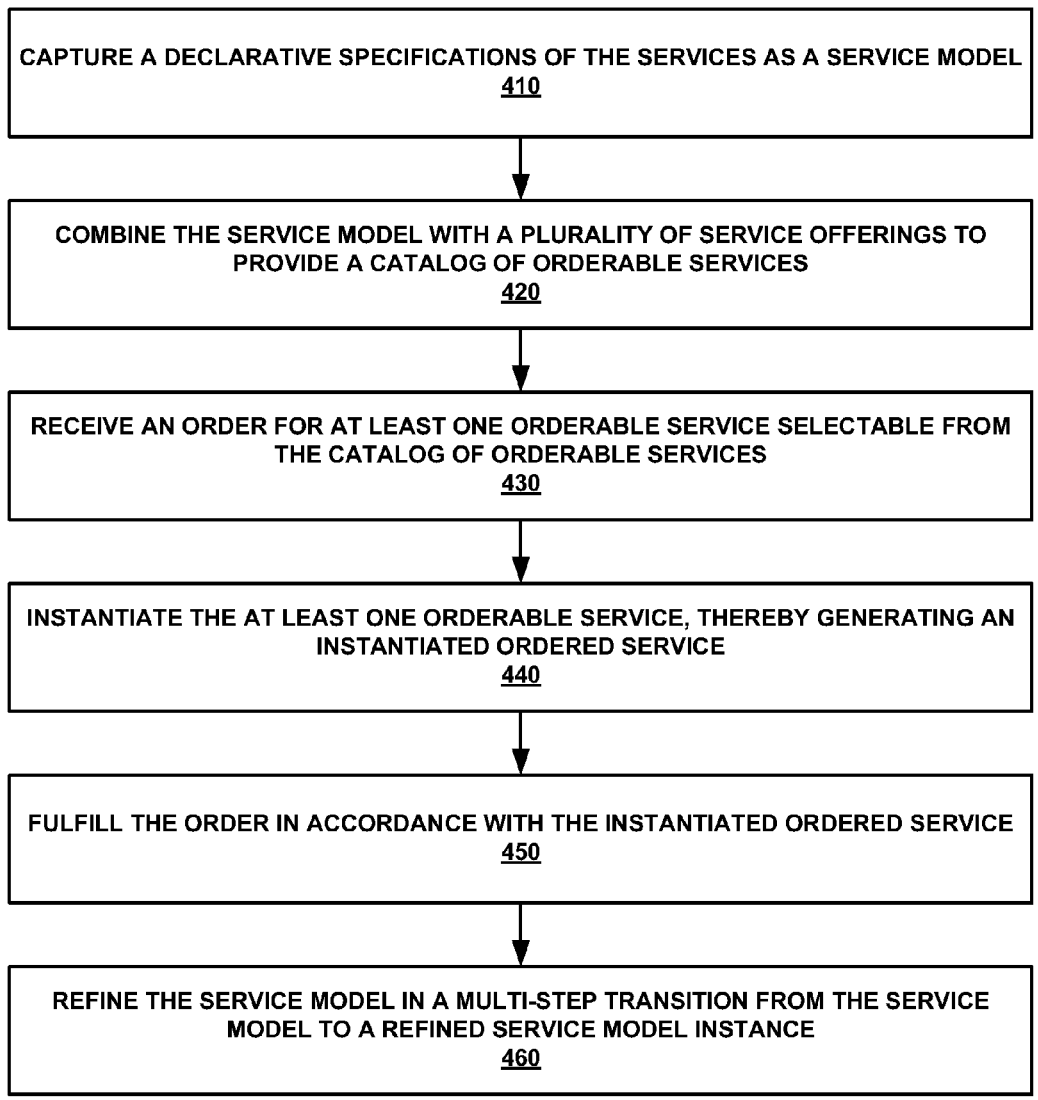
FIG. 4 is a flow chart of a method for managing IT services, according to an embodiment.

FIG. 4 is a flow chart of a method for managing IT services, according to an embodiment. In a particular embodiment, the method may be used to manage the model 100 described with reference to FIGS. 1A and 1B. In an embodiment, the method may be used to manage IT services provided by the architecture 200 deployable in an e-commerce environment. At step 410, declarative specifications of the services are captured as a service models. At step 420 the service models can be combined into a plurality of service offerings to provide a catalog of orderable services. At step 430, an order can be received for at least one orderable service selectable from the catalog of orderable services. At step 440, the at least one orderable service can be instantiated, thereby generating an instantiated ordered service. At step 450, the order can be fulfilled in accordance with the instantiated ordered service.

It is understood, that various steps described above may be added, omitted, combined, altered, or performed in different orders. For example, a step may be added to refine the service models. At step 460, the service models can be refined, the refining including a multi-step transition from the service models to a refined service model instance.

Figure 5:
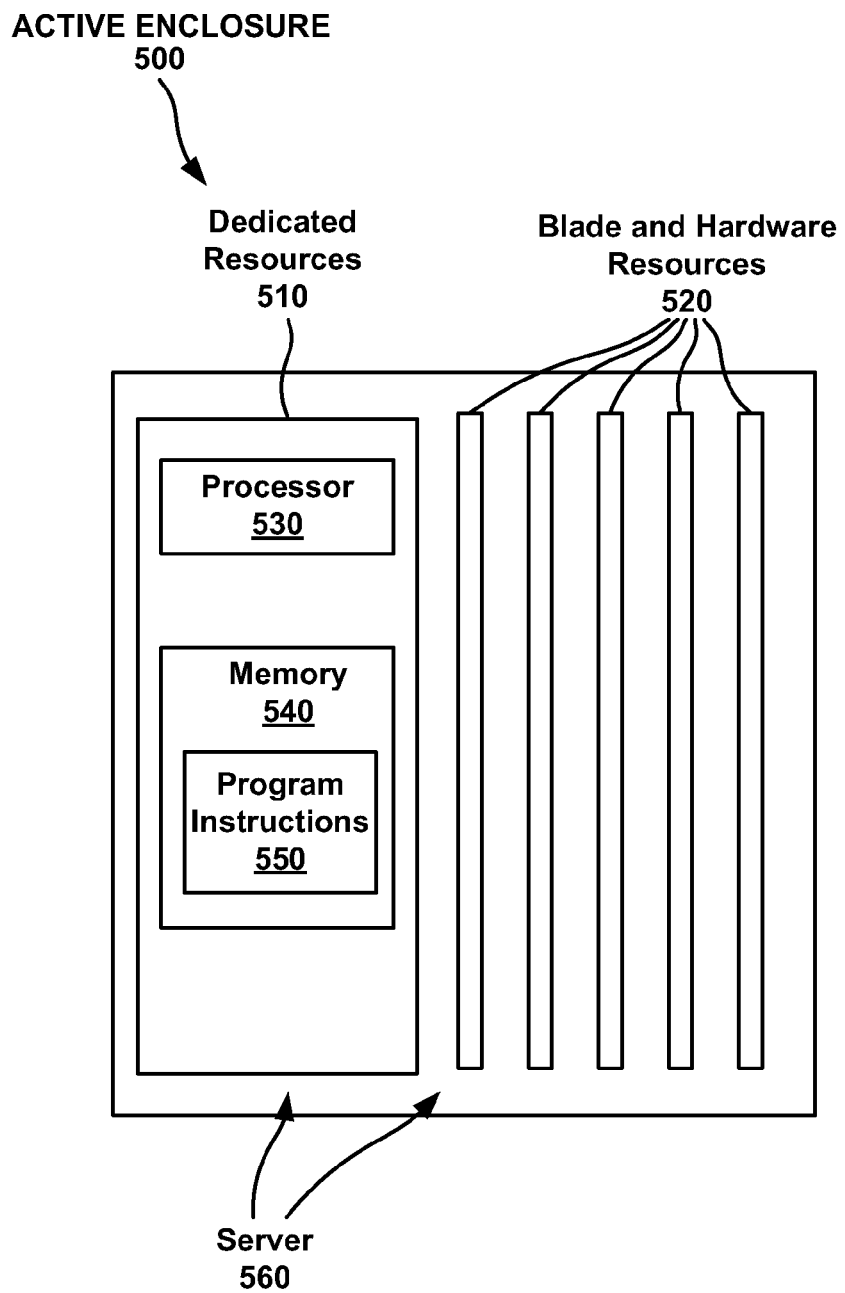
FIG. 5 illustrates a block diagram of an active enclosure, according to an embodiment.

FIG. 5 illustrates a block diagram of an active enclosure 500, according to an embodiment. The active enclosure 500 is a computer system and includes dedicated resources 510, and may be coupled to one or more blade and hardware resources 520. The dedicated resources 510 include a processor 530 coupled to a memory 540. The memory 540 is operable to store program instructions 550 that are executable by the processor 530 to perform one or more functions. It should be understood that the term "computer system" is intended to encompass any device having a processor that is capable of executing program instructions from a memory medium. In a particular embodiment, the various functions, processes, methods, and operations described herein may be implemented using the active enclosure 500. For example, the model 100, the architecture 200, the configure-to-order system 202 and similar others may be implemented using the active enclosure 500.

Components of the active enclosure 500 comprise a server 560. In some embodiments, the server 560 includes the dedicated resources 510. In other embodiments, the server 560 includes the dedicated resources 510 and some hardware resources 520.

The various functions, processes, methods, and operations performed or executed by the active enclosure 500 can be implemented as the program instructions 550 (also referred to as software or simply programs) that are executable by the processor 530 and various types of computer processors, controllers, central processing units, microprocessors, digital signal processors, state machines, programmable logic arrays, and the like. In an example, non-depicted embodiment, the active enclosure 500 may be networked (using wired or wireless networks) with other active enclosures and/or computer systems.

In various embodiments the program instructions 550 may be implemented in various ways, including procedure-based techniques, component-based techniques, object-oriented techniques, rule-based techniques, among others. The program instructions 550 can be stored on the memory 540 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The dedicated resources 510 include hardware used for automated management of the dedicated resources 510 and/or the blade and hardware resources 520. In some embodiments, the automated management includes management of resources external to the active enclosure 500, as discussed further herein and in FIG. 6.

The blade and hardware resources 520 are computer systems, computer components, and/or computer hardware, such as storage arrays, network switches, and the like. In some embodiments, the active enclosure 500 does not include blade and hardware resources 520. In other embodiments, the active enclosure 500 includes one or more blade and hardware resources 520 including one or more computer systems. Hardware within the blade and hardware resources 520 may be coupled to each other, the dedicated resources 510, and/or networked to other computer systems. In some embodiments, one or more program instructions are executed via the blade and hardware resources 520.

In one embodiment, active enclosure 500 provides a turn key system that combines/integrates generic management software with hardware, wherein the management software acts as a runtime environment for the management of the hardware resources. Also, in various embodiments, the active enclosure 500 is self sufficient and may be configured to run independently of other software. In some embodiments, the active enclosure 500 is an open architecture in which management services may be substituted by other services running outside the active enclosure 500.

Figure 6:
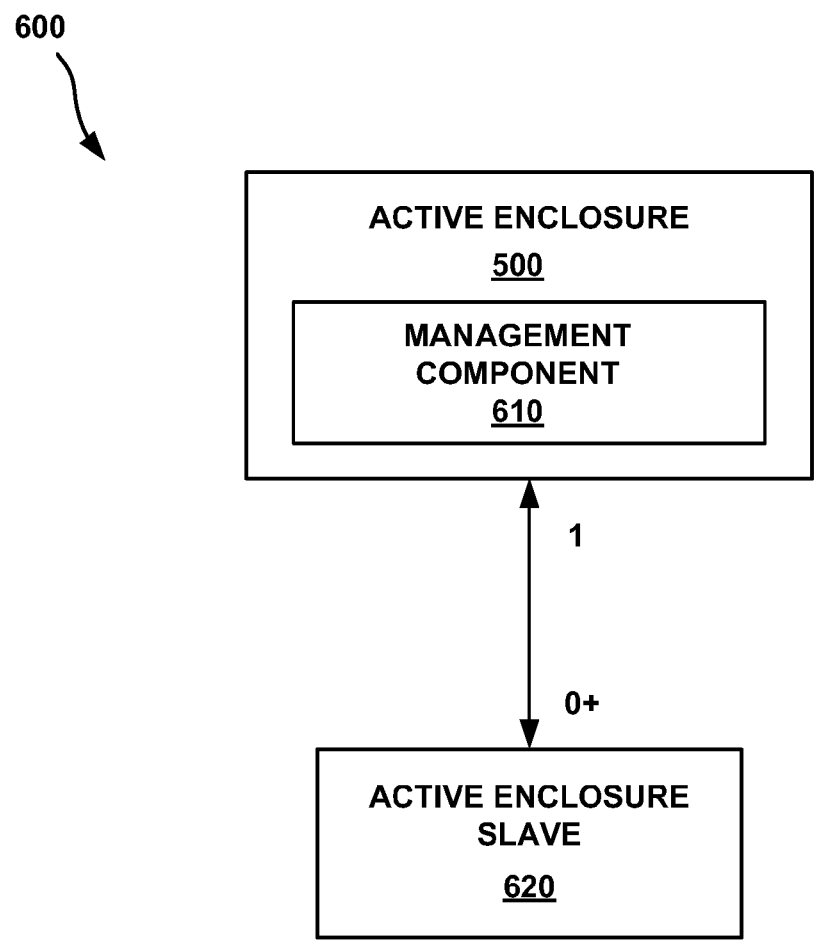
FIG. 6 illustrates an architecture for an active enclosure with a master-slave relationship, according to an embodiment.

FIG. 6 illustrates an architecture 600 for an active enclosure with a master-slave relationship, according to an embodiment. The architecture 600 includes an active enclosure 500 coupled to an active enclosure slave 620. The active enclosure 500 includes a management component 610. As discussed herein, through federation, one or more active enclosures, such as the active enclosure 500, may be networked together and via the management component 610 coordinated one or more services operating on several computer systems. In various embodiments, federation may be performed via a master-slave pattern in which one active enclosure operates as a master and one or more other active enclosures operate as slaves, subordinate to the master. Using a master-slave relationship allows for coordination and/or collaboration of services, hardware and/or other software resources between several active enclosures. Federation allows easy, dynamic and scalable systems. In various embodiments, different services may be instantiated on the master server and/or on one or more different slaves.

Figure 7:
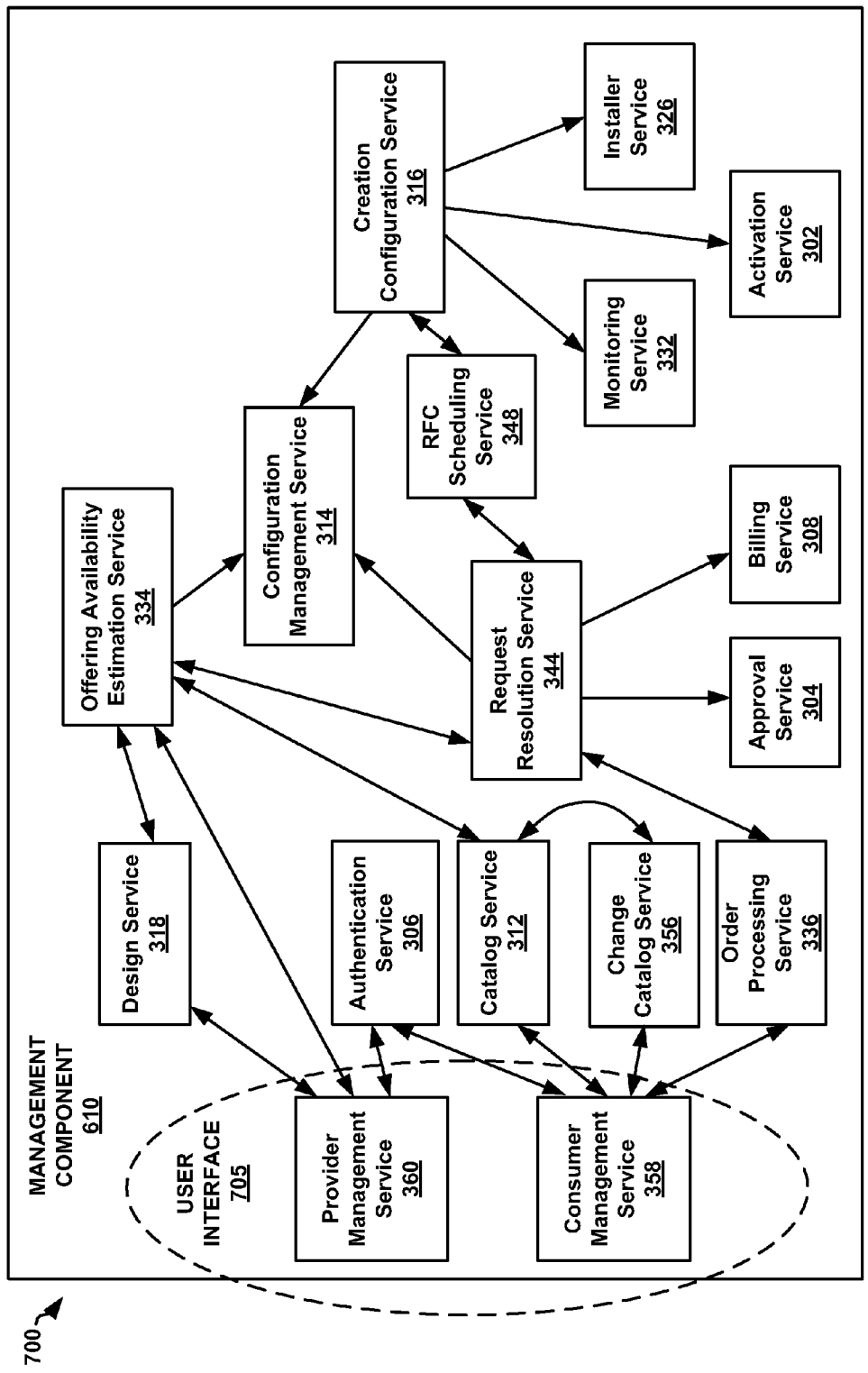
FIG. 7 illustrates a block diagram of a management component of an active enclosure, according to an embodiment.

FIG. 7 illustrates a block diagram 700 of a management component 610 of an active enclosure, according to an embodiment. In embodiments of block diagram 700, the management component 610 includes a provider management service 360, a consumer management service 358, a design service 318, an authentication service 306, an offering availability estimation service 334, a configuration management service 314, an authentication service 306, a catalog service 312, an order processing service 336, a change catalog service 356, a request resolution service 344, an approval service 304, a billing service 308, an RFC scheduling service 348, a creation configuration service 316, a monitoring service 332, an activation service 302, and an installer service 326. In other embodiments, the management component 610 includes a combination of fewer, more and/or different services, such as a discovery service 322, an incident service 324, a logging service 328, a policy service 342, a session service 352, like services and other services.

In various embodiments, the active enclosure 500 has one or more services that have a management interface, such as the provider management service 360 and consumer management service 358. In some embodiments, the active enclosure 500 has several management interfaces and may be selected and/or determined by user privileges. For example, an administrator management interface may be accessed by an administer using an administrator management service, not depicted. The provider management service 360 is coupled to several other services, such as the design service 318, the authentication service 306, and the offering availability estimation service 334. Similarly, the consumer management service 358 is coupled to several other services, such as the authentication service 306, the catalog service 312, the order processing service 336, and the change catalog service 356. In some embodiments, management services are standardized and commoditized which may lower overall development costs, provide guidelines for developers, and increase active enclosure value and usefulness.

The arrows depicted within the management component 610 show a flow direction of information. For example, the design service 318 requests information from and provides information to the offering availability estimation service 334. In various embodiments, the information flow may be unidirectional and/or bi-directional.

Figure 8:
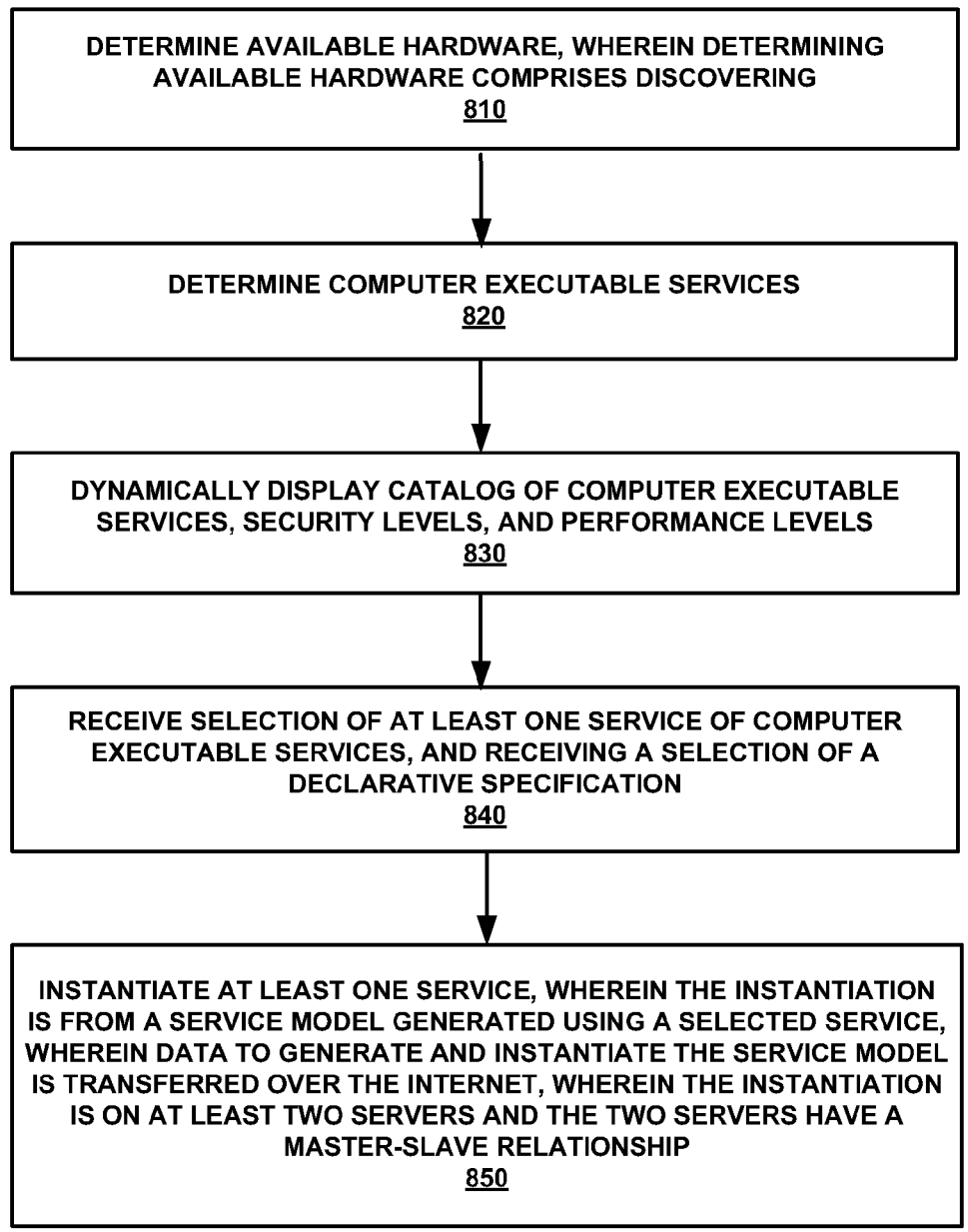
FIG. 8 is a flow chart of a method for managing IT services of an active enclosure, according to an embodiment.

FIG. 8 is a flow chart of a method for managing IT services of an active enclosure, according to an embodiment. In a particular embodiment, the method may be used to instantiate services offered by the active enclosure 500 with reference to FIG. 5. In an embodiment, the method may be used to manage IT services provided by the architecture 200 deployable in an e-commerce environment. At step 810, available hardware is determined, such as hardware from dedicated resources 510 and/or blade and hardware resources 520. In various embodiments, the available hardware includes at least one server. The available hardware may be hardware currently available and/or hardware designed to be available. For example, if particular hardware is being used for another purpose, it may be determined that this particular hardware is not available at this time. In some embodiments, a hardware discovery service, such as discovery service 322, is used to discover and to determine available hardware. Available hardware may be within the active enclosure, within a different active enclosure of the services performing the discovering, and/or outside an active enclosure. In various embodiments, the available hardware is supplied and/or modified via user input.

At step 820, computer executable services are determined. The services are determined based in part on the available hardware, the hardware performance, and/or the services accessible by the active enclosure 500. For example, if a service and/or a service level requires an aggregate and/or average computer performance, and the available hardware is insufficient for the service, the service will be determined as unavailable, that is, the service will not be displayed as an offering. Some computer performance characteristics include response time, throughput (the rate of processing), utilization rates, and availability. Some computer performance metrics may include availability, response time, channel capacity, latency, completion time, service time, bandwidth, throughput, relative efficiency, scalability, performance per watt, and speed up. In parallel computing, speedup refers to how much a parallel algorithm is faster than a corresponding sequential algorithm.

At step 830, a catalog of the computer executable services are displayed. The displayed services may be dependent on a user interface, a user's permission level, and/or the determined hardware. Similar services may be displayed or grouped together for easier selection. Different levels and/or performance of the same or similar service levels may also be displayed. In some embodiments, the catalog displays granulation of services, such as different levels of security and/or performance levels. For example, a user is presented with a high level and medium level of security.

In various embodiments, the catalog display is dynamic. For example, if a user selects a service and only one particular operating system functions well with that service, previously presented operating systems may be removed as to narrow the selection of appropriate operating systems. In some embodiments, the management component 610 determines an operating system based in part on a selected service. In various embodiments, a display of computer executable services is dynamic as resources are allocated for selected services. For example, if ten high performance web servers are selected and the available hardware near full capacity, then some other services that would require more than a capacity of the available hardware is no longer displayed.

At step 840, the active enclosure 500 receives a selection of a service of the computer executable services. In various embodiments, a selection may be a bundle of services and/or performance levels, for example, a high performance database may be bundled with an operating system. In some embodiments, the catalog options are dynamic and may change depending on a user's selection. For example, if a user selects a database with high performance, some options previously presented may be removed, as the combination of the selected service may not be optimal with the removed services. In some embodiments, the selectable services may change dynamically via communications between the consumer management service 358, the catalog service 312, the change catalog service 356, and the offering availability estimation service 334. In various embodiments, the received selection may be a selection of the declarative specification.

At step 850, the selected service is instantiated. The service may be instantiated on the active enclosure 500, on a slave active enclosure, such as active enclosure slave 620, another computer, and/or a combination of computers, as in the case where multiple computers are used. The service is instantiated from a service model. The service model includes the selected service. In various embodiments, the service model includes one or more other service models containing multiple service selections. The service model may be saved and/or stored for later use. In various embodiments, a previous selection of services may be dynamically modified, increased, and/or decreased at any time. For example, if a user wished to downgrade from a high power web service to a medium power web server, the service model may be changed. Thereby, further instantiation of the service model may generate different end points on different resources. In some embodiments, management software allocates resources and end points for multiple service models upon instantiation.

In various embodiments, the management component 610 transfers data over the Internet to generate the service model. Data transferred may include a security key, a license, updates, and/or a full service application. In some embodiments, the management component 610 transfers data over the Internet to instantiate the service model. In various embodiments, service models capture a key value of a vendor, which allows new models to be added at run time without any changes to management software to deploy new services on hardware resources.

It is understood, that various steps described above may be added, omitted, combined, altered, or performed in different orders. For example, a step may be added to refine the service model, and then instantiate the service model. Additionally, at step 840, the offered services can be refined, the refining including a multi-step transition from the service models to a refined service model instance.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining available hardware, wherein the available hardware comprises at least one server;
   determining computer executable services based in part on the available hardware;
   displaying a catalog of the computer executable services, wherein the display of computer executable services is dynamically updated to reflect allocation of resources among previously selected computer executable services by removing a previously presented operating system based on how the operating system functions with the selected computer executable services to narrow the selection of operating systems;
   receiving a selection of at least one service of the computer executable services; and
   instantiating the at least one service on the at least one server, wherein the instantiating includes at least one of a binding phase and a grounding phase.

2. The method of claim 1, wherein the binding phase resolves inter-model dependencies.

3. The method of claim 1, wherein the grounding phase comprises creating an Information Technology artifact corresponding to a specification defined in the design space.

4. The method of claim 1, comprising generating a design service that generates service models.

5. The method of claim 4, wherein the generated service models are combined into a plurality of service offerings that provide the catalog of the computer executable services.

6. The method of claim 4, wherein the design service manages a lifecycle of a model comprising an initial design, cataloguing and refinement.

7. The method of claim 1, further comprising transferring data over the Internet to generate the service model.

8. The method of claim 1, comprising transferring data over the Internet to instantiate the service model.

9. The method of claim 1, comprising instantiating the at least one service on at least two servers.

10. The method of claim 9, comprising establishing a master-slave relationship between the at least two servers.

11. The method of claim 1, comprising:
    modifying the display of the computer executable services in the catalog to reflect allocation of resources to instantiation of the received selection of the at least one service of the computer executable services.

12. A system comprising:
    a network switch; and
    a server configured to:
       determine available hardware;
       determine computer executable services based in part on the available hardware;
       display a catalog of the computer executable services, wherein the display of computer executable services is dynamically updated to reflect an allocation of resources among previously selected computer executable services by removing a previously presented operating system based on how the operating system functions with the selected computer executable services to narrow the selection of operating systems;
       receive a selection of at least one service of the computer executable services; and
       instantiate the at least one service on the server, wherein the instantiating includes at least one of a binding phase and a grounding phase.

13. The system of claim 12, wherein the service model is changed based on a selected power of web service selected by a user.

14. The system of claim 13, wherein the changed service model generates different end points on a different allocation of resources.

15. The system of claim 12, wherein the catalog is configured to display an offering of more than one performance level.

16. The system of claim 12, wherein the catalog is configured to display an offering of more than one security level.

17. A non-transitory computer readable medium having embodied thereon a program, the program being executable by a computing device for performing a method for processing concurrent events in a provisional network, the method comprising:
    determining available hardware, wherein the available hardware comprises at least one server;
    determining computer executable services based in part on the available hardware;
    displaying a catalog of the computer executable services, wherein the display of computer executable services is dynamically updated to reflect allocation of resources among previously selected computer executable services by removing a previously presented operating system based on how the operating system functions with the selected computer executable services to narrow the selection of operating systems;
    receiving a selection of at least one service of the computer executable services; and
    instantiating the at least one service on the at least one server, wherein the instantiating includes at least one of a binding phase and a grounding phase.

18. The non-transitory computer readable medium of claim 17, wherein the service model creates a design space to accommodate refinement.

19. The method of claim 18, wherein the instantiation of the service model is multi-step for greater flexibility due to the refinement.

* * * * *

UNITED STATES PATENT AND TRADEMARK OFFICE
CERTIFICATE OF CORRECTION

| | | |
|---|---|---|
| PATENT NO. | : 8,392,566 B1 | Page 1 of 1 |
| APPLICATION NO. | : 12/261187 | |
| DATED | : March 5, 2013 | |
| INVENTOR(S) | : Mathias Salle et al. | |

It is certified that error appears in the above-identified patent and that said Letters Patent is hereby corrected as shown below:

In the Claims

In column 16, line 51, in Claim 19, delete "The method of" and insert -- The non-transitory computer readable medium of --, therefor.

Signed and Sealed this
Twenty-fifth Day of March, 2014

Michelle K. Lee
*Deputy Director of the United States Patent and Trademark Office*